United States Patent [19]
A'Lateef

[11] Patent Number: 6,070,543
[45] Date of Patent: Jun. 6, 2000

[54] WATERCRAFT

[76] Inventor: Nmngani A'Lateef, P.O. Box 13925, Jeddah 21414, Saudi Arabia

[21] Appl. No.: 09/050,051

[22] Filed: Mar. 30, 1998

[51] Int. Cl.[7] .......................................................... B63B 1/26
[52] U.S. Cl. .................................... 114/55.55; 114/55.57; 114/274; 114/280
[58] Field of Search .......................... 114/55.54, 55.55, 114/55.57, 272, 274, 280, 281, 282; 440/79

[56] References Cited

U.S. PATENT DOCUMENTS

| | | |
|---|---|---|
| 955,343 | 4/1910 | Meacham et al. . |
| 1,410,876 | 3/1922 | Bell et al. . |
| 3,693,570 | 9/1972 | Erlykin et al. . |
| 4,926,773 | 5/1990 | Manor . |
| 4,981,099 | 1/1991 | Holder . |
| 5,329,870 | 7/1994 | Cook . |
| 5,359,958 | 11/1994 | Guild . |
| 5,544,607 | 8/1996 | Rorabaugh et al. . |

*Primary Examiner*—Sherman Basinger
*Attorney, Agent, or Firm*—McDermott, Will & Emery

[57] ABSTRACT

An aircraft-like body is provided with a keel that extends below and to the rear of the main body. The keel is provided with a large horizontally extending hydrofoil which produces a positive lift. The keel is further provided with a smaller hydrofoil which is located aft of and below the positive life hydrofoil and which produces a negative lift. The negative lift hydrofoil is located both aft of and below that which produces the positive lift. The downward force which is produced by the trailing hydrofoil produces a cranking action which produces a moment and applies a lifting force which, as the vehicle proceeds through the water, lifts the nose of the vehicle and impart an aircraft lift-like flying type of sensation to the operator.

14 Claims, 24 Drawing Sheets

WATERCRAFT

BACKGROUND OF THE INVENTION

1. Field of the Invention

The present invention relates to a water craft. More specifically, the present invention relates to a hydrofoil equipped watercraft which is able to lift and support a main body of the vehicle above the surface of the water and produce aircraft-like maneuverability during operation.

2. Description of the Related Art

U.S. Pat. No. 5,544,607 issued to Rorabaugh et al. on Aug. 13, 1996, discloses a watercraft which is equipped with both hydrofoils and pivotal pontoons or sponsons. Embodiments disclosed in this patent include a personal hydrofoil watercraft which is essentially similar to the so-called "jet-ski" and which is provided with fore-and-aft-hydrofoil assemblies that are aligned with one another and which respectively have horizontally extending fin members which are adapted to produce lift as the vehicle passes through the water. The lower end of the rear hydrofoil assembly is also provided with a propulsion section which takes the form of an elongate aircraft engine-like nacelle.

However, while this arrangement has enabled the body of the jet-ski like arrangement to be lifted out of the water during operation, it has lacked the ability to produce any driving characteristics other than that which would be derived with conventional hydrofoil boats of a similar nature. That is to say, it handles essentially like a boat equipped with hydrofoils and is incapable of producing any unexpected handling characteristics.

Other attempts to provide high performance watercraft which utilize hydrofoils are disclosed in U.S. Pat. No. 4,981,099 issued to Holder on Jan. 1, 1991; U.S. Pat. No. 5,359,958 issued to Guild on Nov. 1, 1994; and U.S. Pat. No. 5,329,870 issued to Cook on Jul. 19, 1994. However, these arrangements, like that disclosed in the Rorabaugh et al. patent, have been such as to behave merely as boats which are equipped with hydrofoils, and have lacked the ability to produce aircraft-like control characteristics during operation.

A further attempt to produce an aircraft-like water vehicle is disclosed in U.S. Pat. No. 4,926,773 issued to Manor on May 22, 1990. In this arrangement, the water vehicle is provided with both hydrofoils and a bat-like lifting body type wing which reacts with the air flowing thereagainst and cooperates with the foils during operation of the vehicle to improve the lift and control characteristics. However, this arrangement has exhibited even less aircraft like characteristics than the above-mentioned arrangements in that it is based on a pontoon-type arrangement which defeats the ability of the vehicle to exhibit side to side roll, nose dive (pitch) etc.

SUMMARY OF THE INVENTION

It is an object of the present invention to provide a watercraft which can provide the user with aircraft-like ride characteristics and which enables the user to experience a unique flight-like sensation when operating the same and "flying over the water".

It is a further object of the invention to provide a watercraft which has a single rearwardly extending keel on which a lower hydrofoil, which produces a negative lift, is provided in combination with a larger upper hydrofoil which produces a positive lift, and wherein the combined negative and positive lifts generates a moment of force which enables a forward projecting portion of a main aircraft-type nacelle shaped body to be lifted up from the water and maintained in a flight-like state during forward motion of the vehicle.

It is yet another object of the present invention to provide a watercraft which enables a user to assume a semi-prone operating position and to control the vehicle using a uniquely simple motorcycle-like handlebar arrangement to control not only the speed of the vehicle but the roll, pitch, yaw and turning of same.

In brief, the above objects are achieved by an arrangement wherein an aircraft-like body is provided with a keel that extends below and to the rear of the main body. The keel is provided with a large horizontally extending hydrofoil which produces a positive lift. The keel is further provided with a smaller hydrofoil which is located aft of and below the positive life hydrofoil and which produces a negative lift. Because the negative lift hydrofoil is located both aft of and below that which produces the positive lift, the downward force which is produced by the trailing hydrofoil produces a cranking action which produces a moment and therefore applies a lifting force which, as the vehicle proceeds through the water, lifts the nose of the vehicle and impart an aircraft lift-like flying type of sensation to the operator. The fact that the hydrofoils are placed on the same keel allows for increased maneuverability in the areas of roll, pitch and yaw. The pitch is controlled by varying the amount of power that is supplied to a propulsion unit or units.

More specifically, a first aspect of the invention resides in a water craft comprising: a main body; a keel extending from a lower portion of the main body; a first hydrofoil provided on the keel, the first hydrofoil being adapted to produce a positive lift force which lifts the craft upwardly when the vehicle travels through water; and a second hydrofoil provided on the keel, the second hydrofoil being adapted to produce a negative lift force which tends to pull the vehicle downwardly when the vehicle travels through water, the second hydrofoil being located on the keel at a level which is lower than that of the first hydrofoil and located so that the negative lift force which is produced by the second hydrofoil, in combination with the positive lift force which is produced by the first hydrofoil generates a moment of force which tends to crank the front of the water craft upwardly.

This first aspect of the invention further features a structure wherein the keel extends downwardly and rearwardly of the main body and wherein the second hydrofoil is located both below and aft of the first hydrofoil.

A further feature comes in that a nose cone is mounted at the front of the main body, and is such as to be rotatably mounted on the main body and arranged to rotatable in accordance with manual manipulation by a rider.

The above mentioned water craft further comprises control surfaces which are provided on the keel and on at least one of the first and second hydrofoils, and additionally includes manually controllable control means disposed in the nose cone, the control means being operatively connected with the control surfaces.

The craft includes a propulsion arrangement including a motor and means operatively connected with the motor for causing water to flow away from the keel in a manner to generate a forward driving force which propels the craft through the water. The operative connection means includes contra-rotating shafts which are operatively connected with first and second propellers which are rotatably supported on the keel.

A further feature of the above mentioned craft resides in that the control means comprises: a steering cylinder; a pair of handle bar-like handles operatively supported on the steering cylinder for rotating the cylinder about an axis of rotation, the pair of handles being movably axially along the steering cylinder; means, disposed in the steering cylinder for, in response to axial movement of the handles, inducing movement of a control surface on the second hydrofoil; means operatively connected with the steering cylinder, for, in response to rotation of the steering cylinder about its axis, translating the rotation to control surfaces on the first hydrofoil and the keel.

In this water craft the first and second hydrofoils respectively comprise first and second pairs of hydrofoil wings which extend out from the keel, and wherein the control surfaces are respectively provided on trailing edges of the keel and the first and second pairs of hydrofoil wings. A semi-prone rider support means, which is adapted to support a rider in a semi-prone riding position, is located immediately aft of the nose cone which is itself provided with left and right apertures through which the left and right arms of a rider can be passed and that provide access to the handles supported on the steering cylinder.

A second aspect of the invention resides in a method of operating a water craft comprising the steps of: producing a first positive lift force using a first hydrofoil; producing a second smaller negative lift force using a second hydrofoil; and producing a moment of force by arranging the positive lift force to be produced at a position which higher and forward of the position at which the negative lift force is produced.

This method further includes the steps of steering and banking the craft by controlling the positions of a rudder and a pair of ailerons which are respectively mounted on a keel and the first hydrofoil, the first hydrofoil being mounted on the keel. Controlling the pitch of the craft is achieved by altering the position of control surfaces that are provided on the second hydrofoil.

BRIEF DESCRIPTION OF THE DRAWINGS

The various features and attendant advantages of the invention will become clearly appreciated as a description of the preferred embodiments of the present invention is given with reference to the appended drawings in which.

DESCRIPTION OF THE PREFERRED EMBODIMENTS

Figure 1:
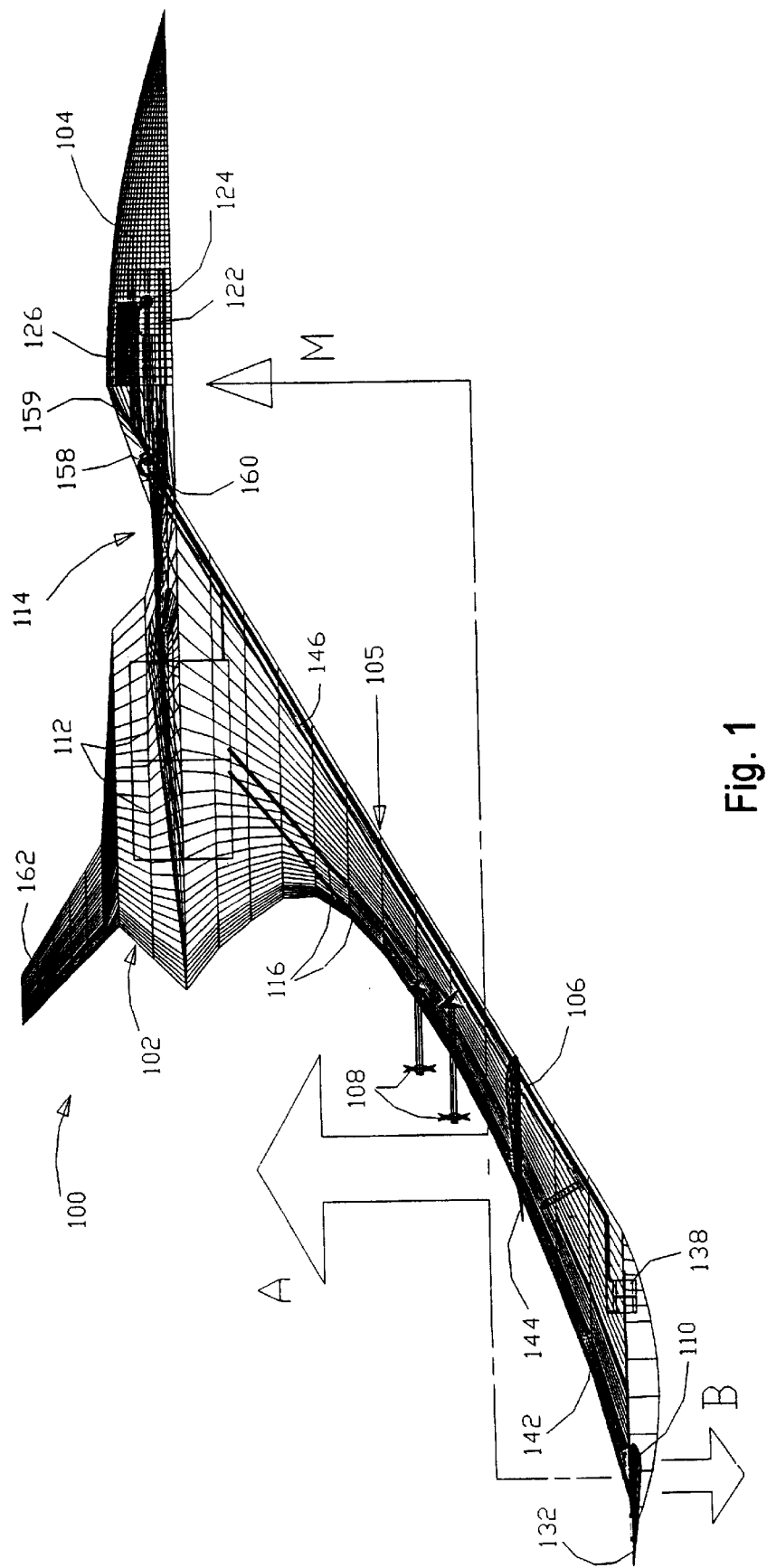
FIG. 1 is a wire mesh type side view of a water craft according to the present invention showing the disposition of the power plant, the steering controls, the hydrofoils and links between the steering controls and the control surfaces which allow the craft to be controlled.
Figure 2:
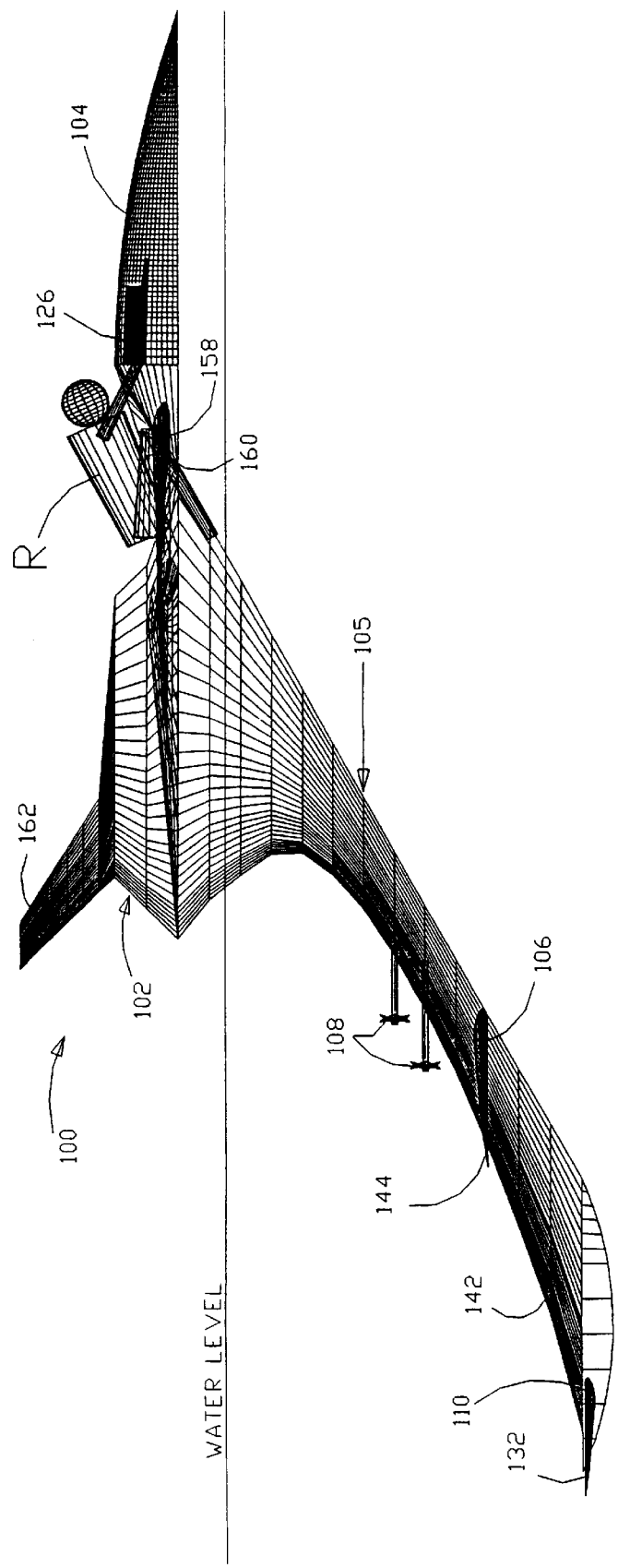
FIG. 2 is a side view similar to that shown in FIG. 1, but showing a rider mounted on the craft with the craft in a stationary/low speed condition in the water.
Figure 3:
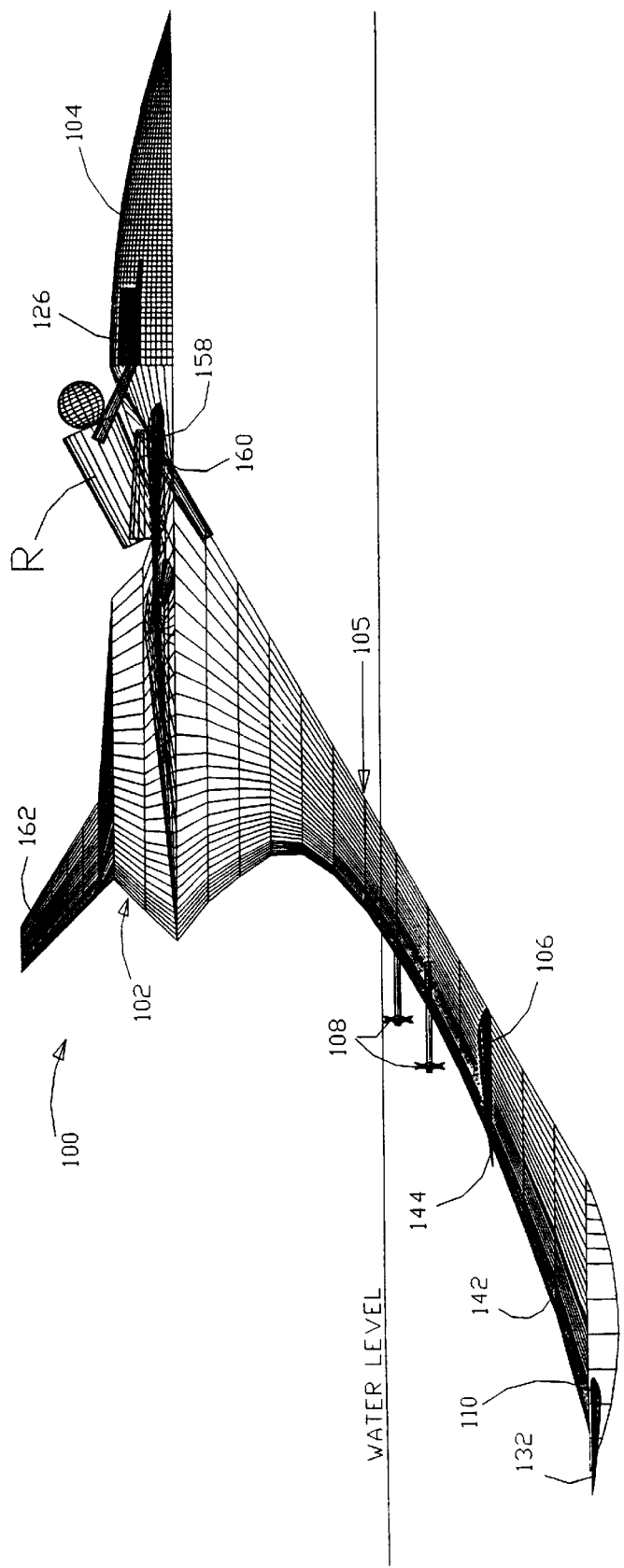
FIG. 3 is a side view similar to those shown in FIGS. 1 and 2 showing the craft lifted out of the water in accordance with the effect of the hydrofoil arrangement which characterizes the craft of the invention.
Figure 4:
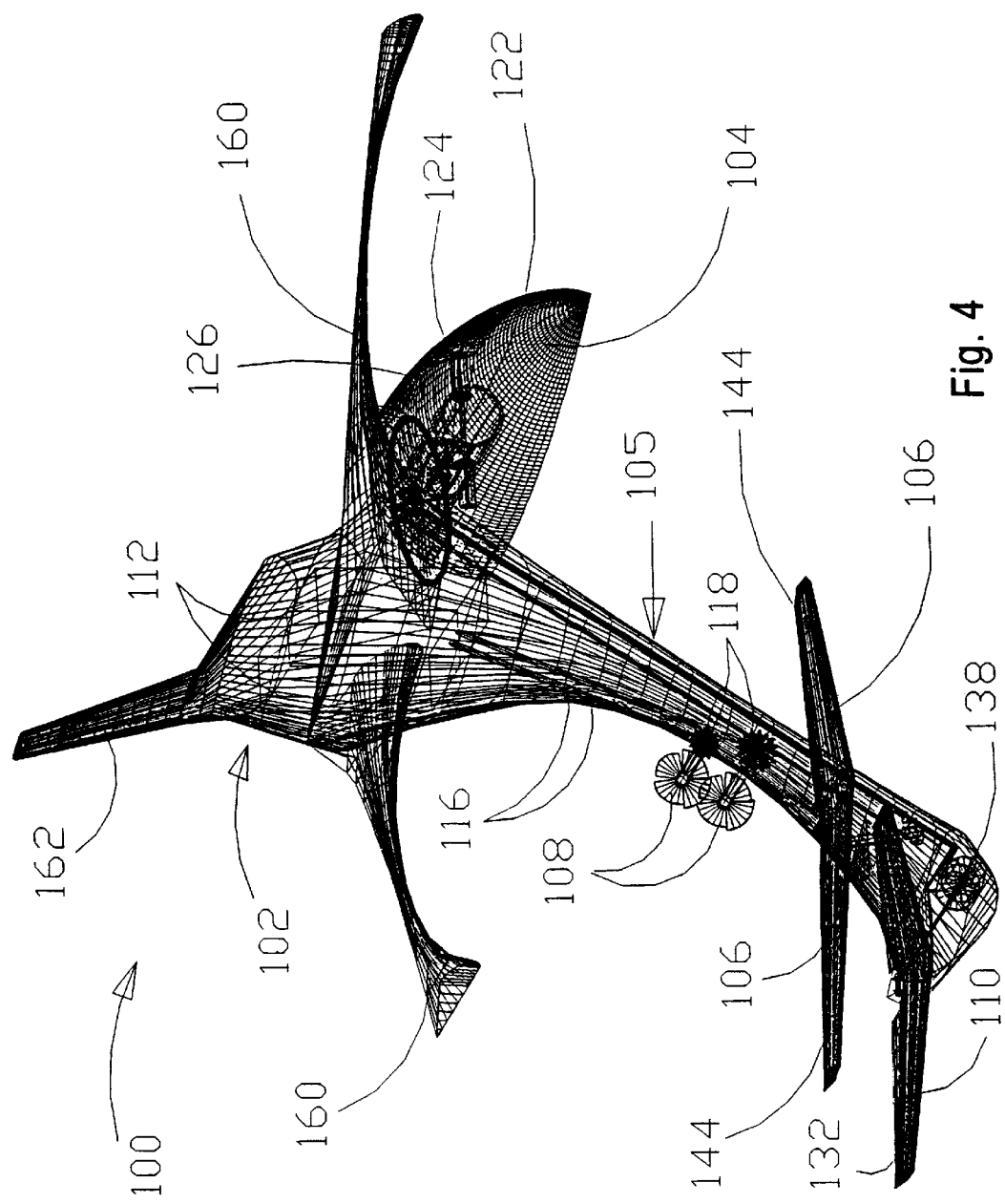
FIG. 4 is a perspective wire mesh type view of the water craft according to the invention showing details of the steering control and propulsion arrangements associated with the embodiment of the invention.
Figure 5:
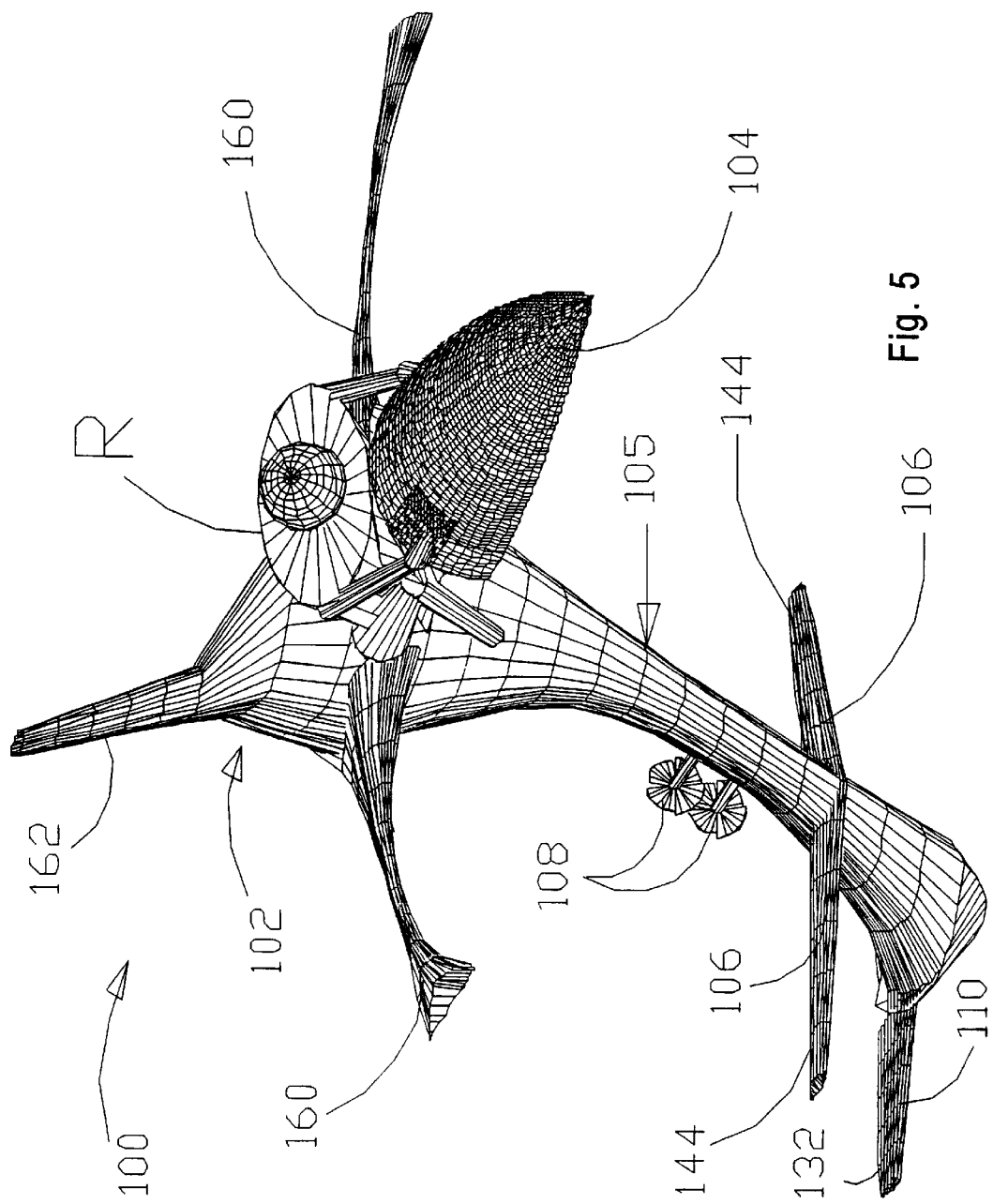
FIG. 5 is a perspective view similar to that shown in FIG. 4 illustrating a rider mounted on the craft.
Figure 6:
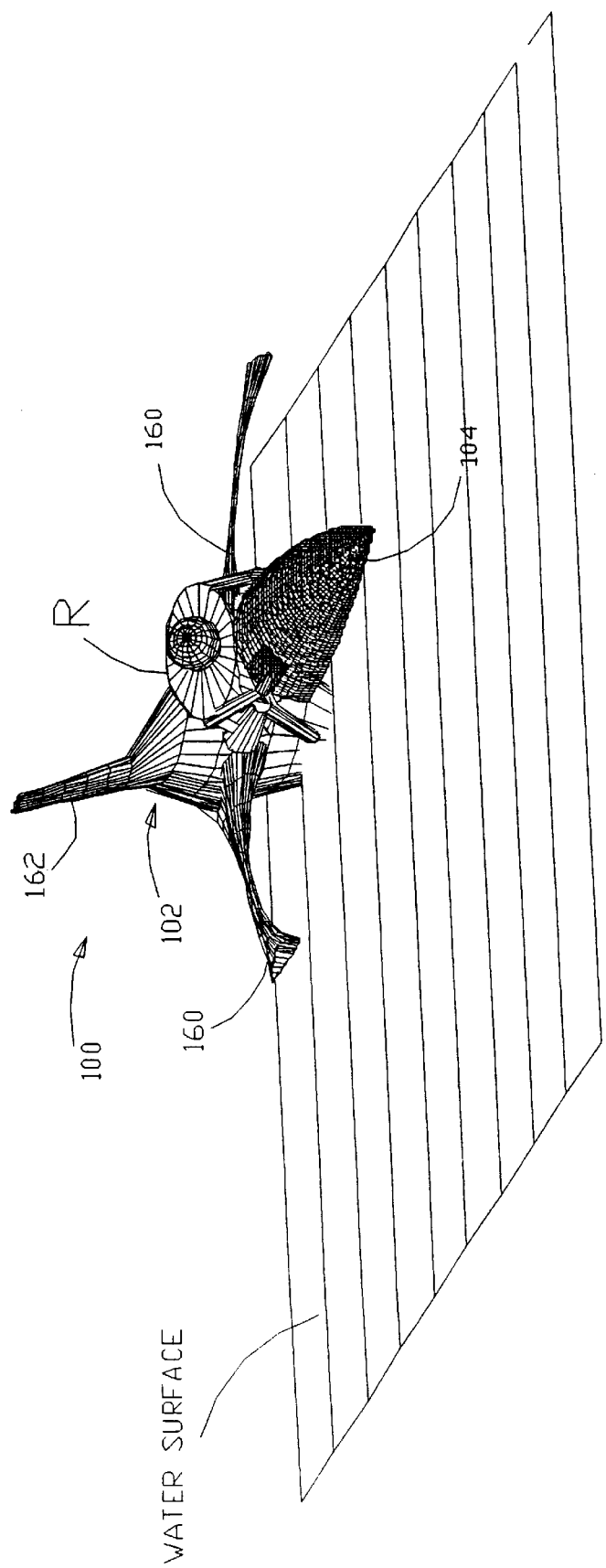
FIGS. 6 and 7 are respectively perspective views schematically showing the manner in which the water craft, according to the present invention, lifts out of water in response to the lifting characteristics provided by the hydrofoil arrangement.
Figure 7:
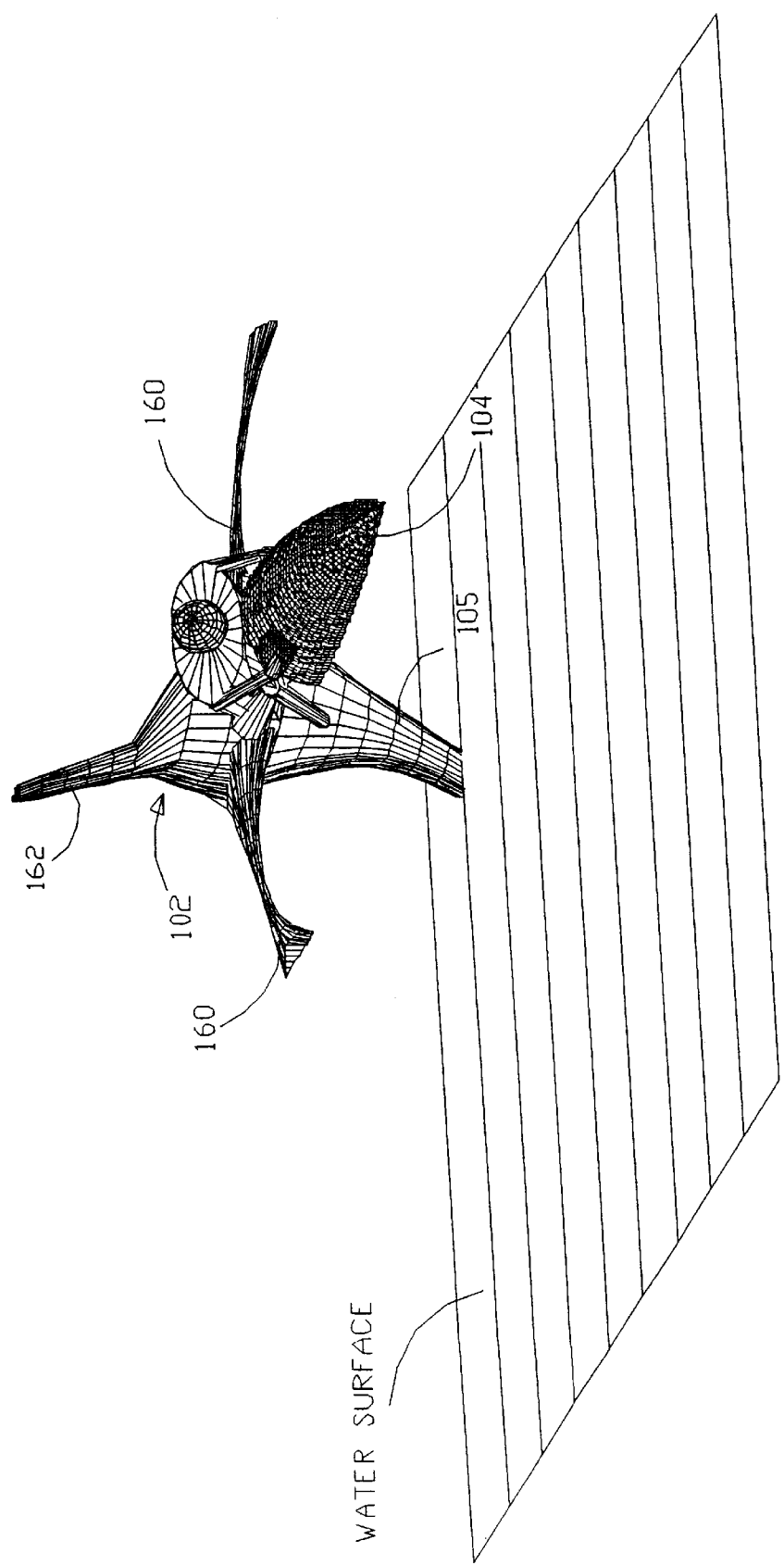

FIGS. 1–13 show, in wire mesh CAD/CAM type views, the shape and arrangement of an embodiment of the water craft according to the present invention. This craft 100 comprises a main body 102, a rotatable nose cone 104 mounted at the front of the body, a keel 105, a pair of main lifting (positive lift) hydrofoil wings 106 mounted on the keel 105 at a level below that at which a pair of propellers or screws 108 are disposed, and a lower pair of negative lift hydrofoil wings 110 which are located proximate the lower end of the keel 105 so as to be aft and lower than the positive lift wings 106.

The basic feature of this structure is that the main lifting hydrofoil wings 106 produce a lifting force A which lifts the vehicle 100 up out of the water during forward motion, while the lower negative lift wings 110 produce a downward force B which is generated below and aft of the upward force A produced by the main lifting wings 106, and produces a moment of force M which tends to lifts the nose 104 of the vehicle upwardly. By designing the positive and negative lift characteristics of the two sets of hydrofoil wings 106, 110 in view of the weight and the distribution of the weight in the main body 102 and nose 104 of the vehicle and in light of the amount of power which is available from the motor/motors 112 mounted in the vehicle body, a highly maneuverable and exciting craft can be constructed.

The motor or motors 112 are those of the type used in marine applications such as in outboard engines. However, any other suitable self-contained power plant can be used in the water craft according to the present invention. As shown in FIG. 1 the positioning of these motor or motors 112 is such as to be toward the rear of the vehicle and aft of the rider's seat 114. This disposition not only places the weight of the motor/motors 112 close the center of gravity of the vehicle but reduces the distance from the propellers or screws 108 which are used to actually propel the craft 100 through the water.

As will be appreciated, the motors 112 are heaviest and most dense piece/pieces of apparatus used in the vehicle construction and the disposition of this apparatus with respect to the forces A, B which are produced by the positive and negative lift hydrofoil wings 106, 110, is important in order to ensure that the maneuverability of the craft 100 is maximized and the rider's enjoyment intensified.

In this embodiment twin screws, which are located one above the other and rotate in opposite directions, are used. However, the invention is not limited to this type of propeller configuration and can be replaced with any suitable other form of propulsion system such as water jet propulsion or the like.

Since this particular facet of the invention is not critical to the invention and the various types of marine propulsion which could be incorporated into the water craft according to the invention, are well known, the need to described in detail is absent and will be omitted for the sake of brevity.

Figure 17:
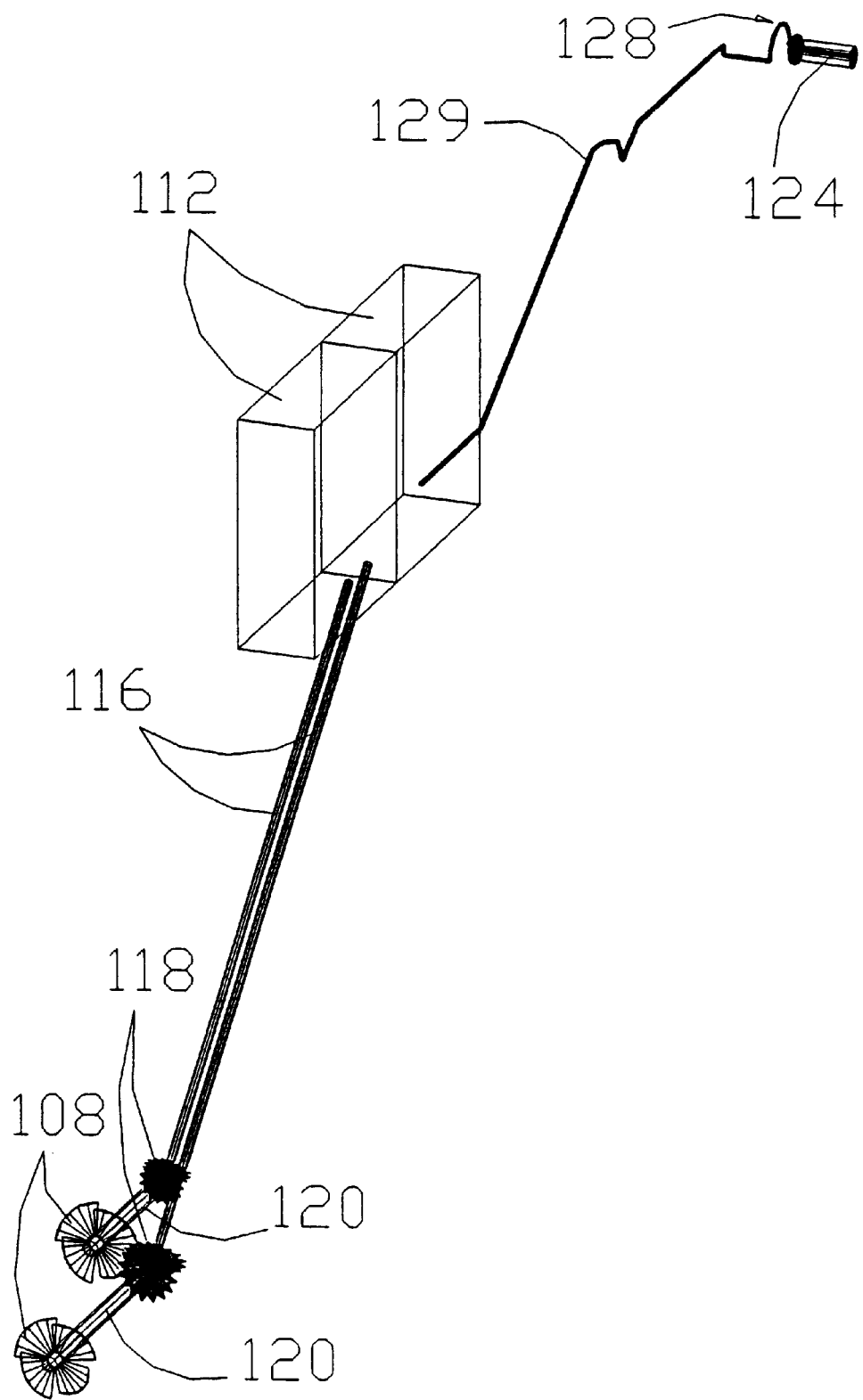
FIG. 17 is a perspective view showing the manner in which a simple motor cycle twist type throttle arrangement is used to control the amount of power produced by the power plant of the vehicle.
Figure 18:
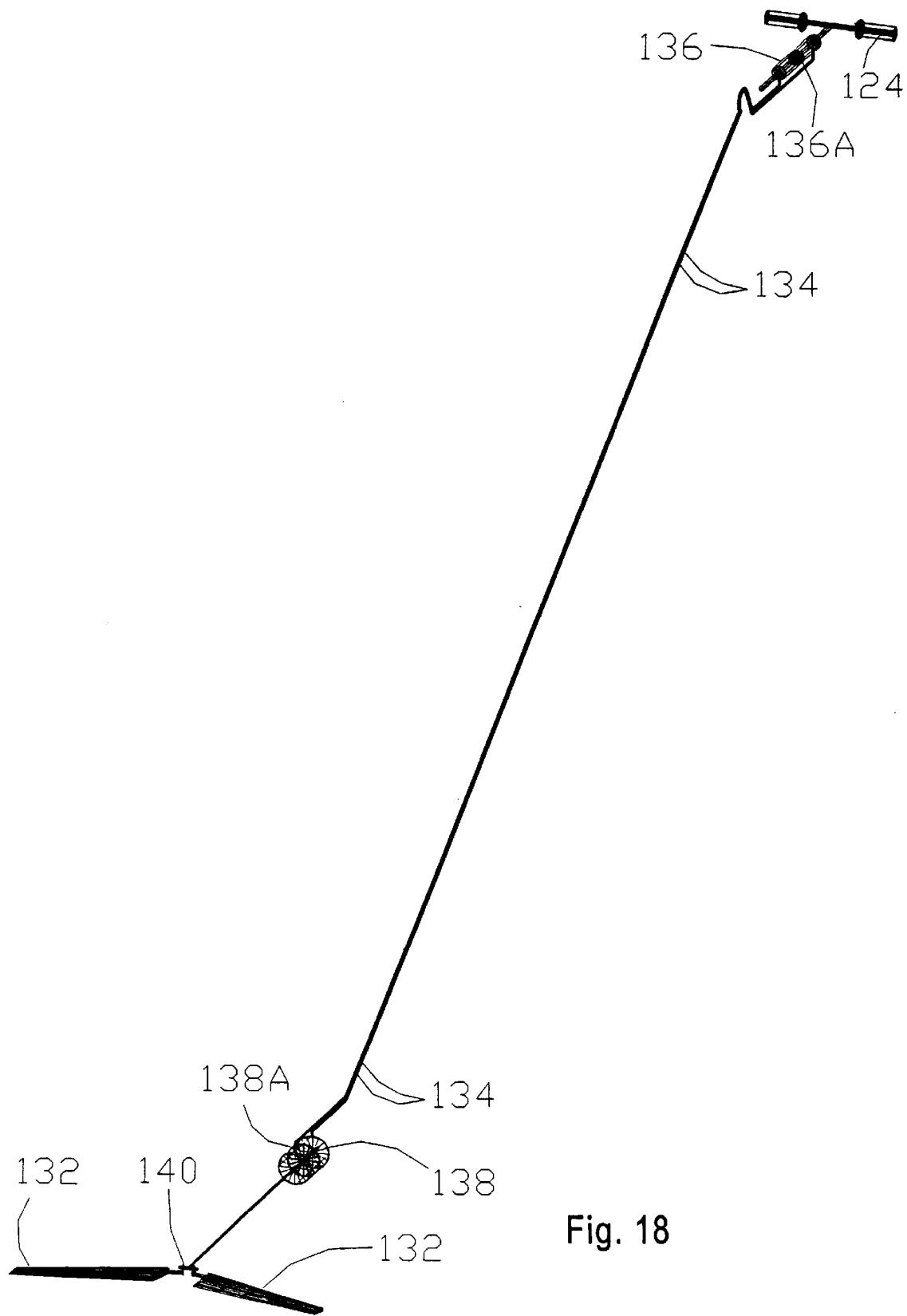
FIG. 18 is a perspective view showing the hydraulic arrangement via which the handle bar-like control arrangement is connected with the lowermost hydrofoils to allow for pitch control.

In this particular embodiment, connection between the motor/motors 112 is achieved in the manner indicated in FIG. 17

As will be appreciated, two contra-rotating drive shafts 116 are arranged to extend down from the motor/motors 112 through the keel 105 to gears 118 which translate the rotation of the shafts 116 to the shafts 120 on which the propellers or screws are mounted. Although the propellers 108 are illustrated as being exposed, it is possible to place cowlings around the same and to additionally direct the flow of water and/or help prevent accidental contact with an object which does not form part of the water craft per se.

Figure 13:
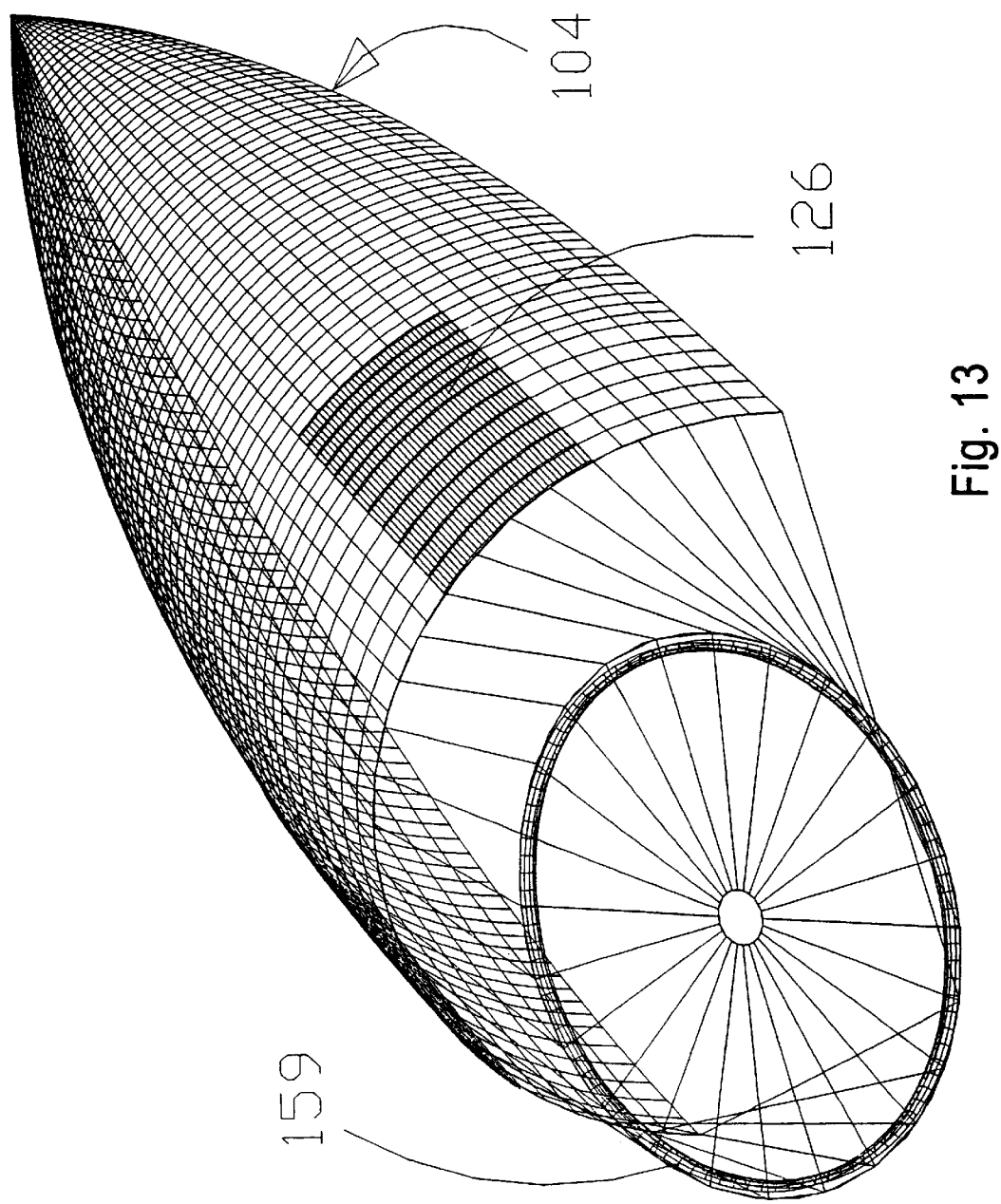
FIG. 13 is a perspective view showing a nose-cone portion of the vehicle and depicting a connection structure which allows the nose to be movably mounted on the main body of the vehicle.

The nose or nose cone 104 of the vehicle is mounted so as to be rotatable with respect to the main body portion 102. In this embodiment, the nose cone 104, details of which are shown in FIG. 13, is arranged to be rotatable amount an axis which angled with respect to the longitudinal axis of the nose cone member per se. The reason for this is to produce a steering-like effect when the rider R effects a turn, and the nose 104 does not remain in line with the remainder of the vehicle and tends, due to the angled connection, to cant off downwardly to one the side. This imparts an increased sense of roll and turning sensation to the rider R.

Figure 12:
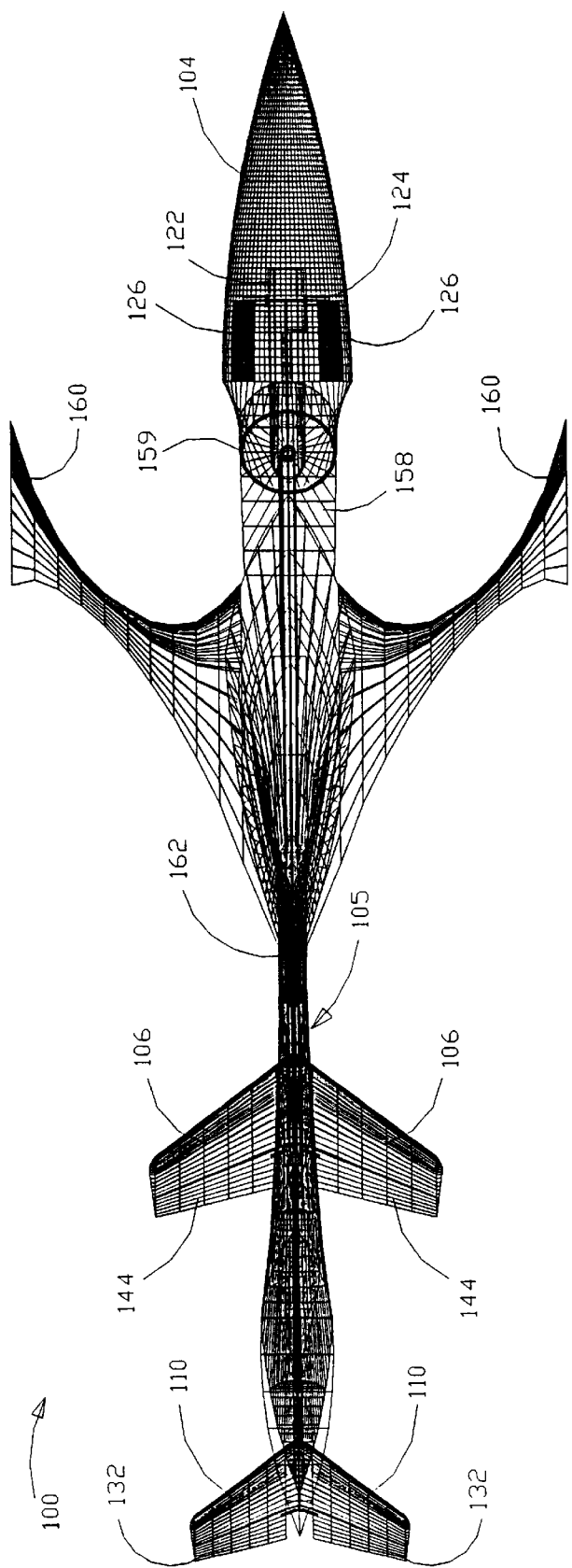
FIG. 12 is plan view depicting the shape and disposition of the hydrofoils and a simulated air-wing/tail of the craft.
Figure 22:
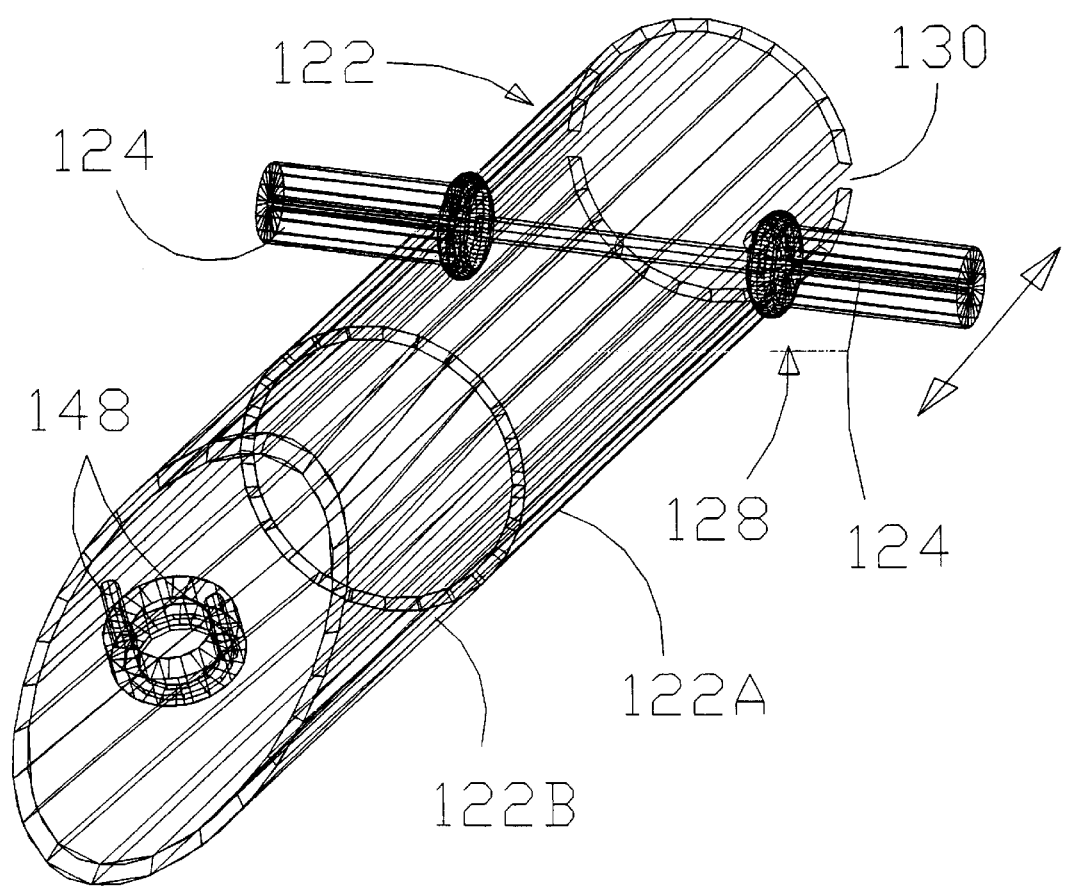
FIG. 22 is an enlarged perspective view of the handle-bar control arrangement showing the connections to which the control rods which extend down through the keel to the rudder and ailerons, are operatively connected.

The interior of the nose cone 104 is essentially hollow to reduce weight and houses what shall be referred to as a "steering cylinder" 122. The shape and arrangement of this steering cylinder 122 is best seen in FIG. 22. As shown, a pair of handle bar-like handles 124 are arranged to project out from either side of the main cylinder body 125 of the device. Access to these handles 124 is provided to the rider R by tunnel-like apertures 126 which are formed in the sides of the nose cone. The location of these apertures 126 is indicated in FIGS. 12 and 13, for example. The cylinder 122 and the nose cone 104 are adapted to rotate synchronously.

One of the handles 124 is provided with a motor cycle hand throttle arrangement 128. This throttle is, as best seen in FIG. 17, connected to the motor/motors by a cable 129. As is conventional, for safety reasons, if the grip with which the throttle 128 is associated, is released for any reason, a spring returns the throttle to a minimum setting. This piece of apparatus is of course available "off the shelf" and accordingly a detailed description of the mechanism and cable via which it is connected to the motor/motors is unnecessary.

The steering cylinder 122 is mounted in the nose cone 104 so as to be rotatable about its longitudinal axis. The handles 124 are arranged to be slidable back and forth along slots 130 formed in the sides of the steering cylinder 122. An alternative to the provision of these slots 130 is, of course, to arrange the cylindrical body in two telescopic halves 122A, 122B to allow for the foreword and rearward movement of the handles through telescopic contraction/extension of the cylinder per se.

Figure 19:
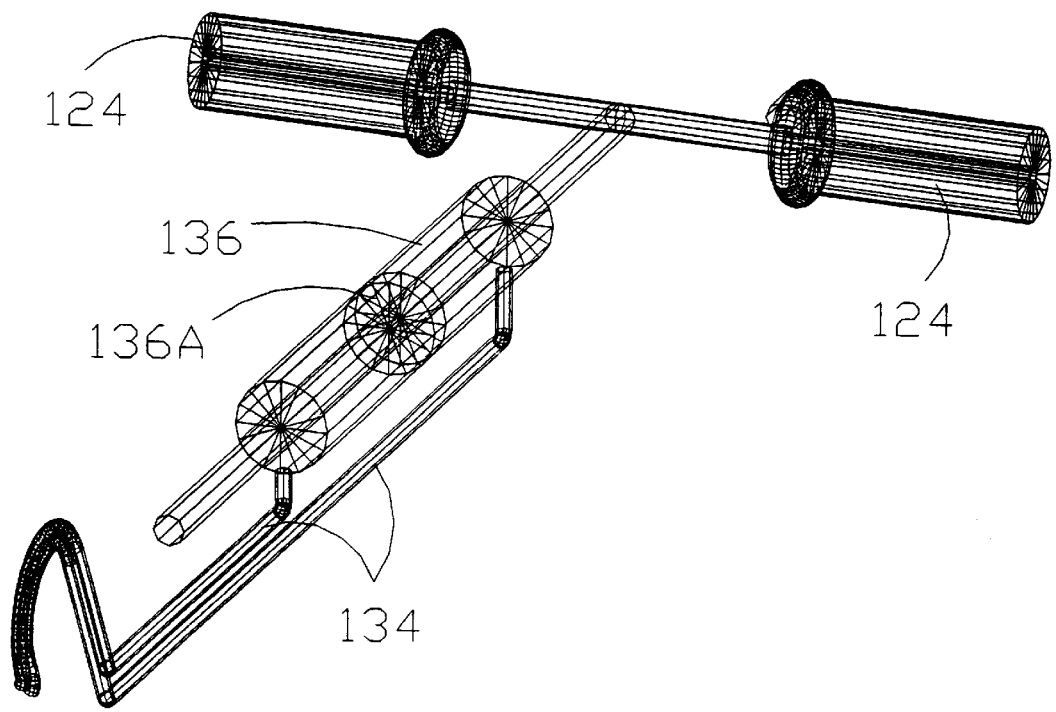
FIG. 19 is an enlarged schematic view of the handle bar arrangement depicted in FIG. 18.
Figure 20:
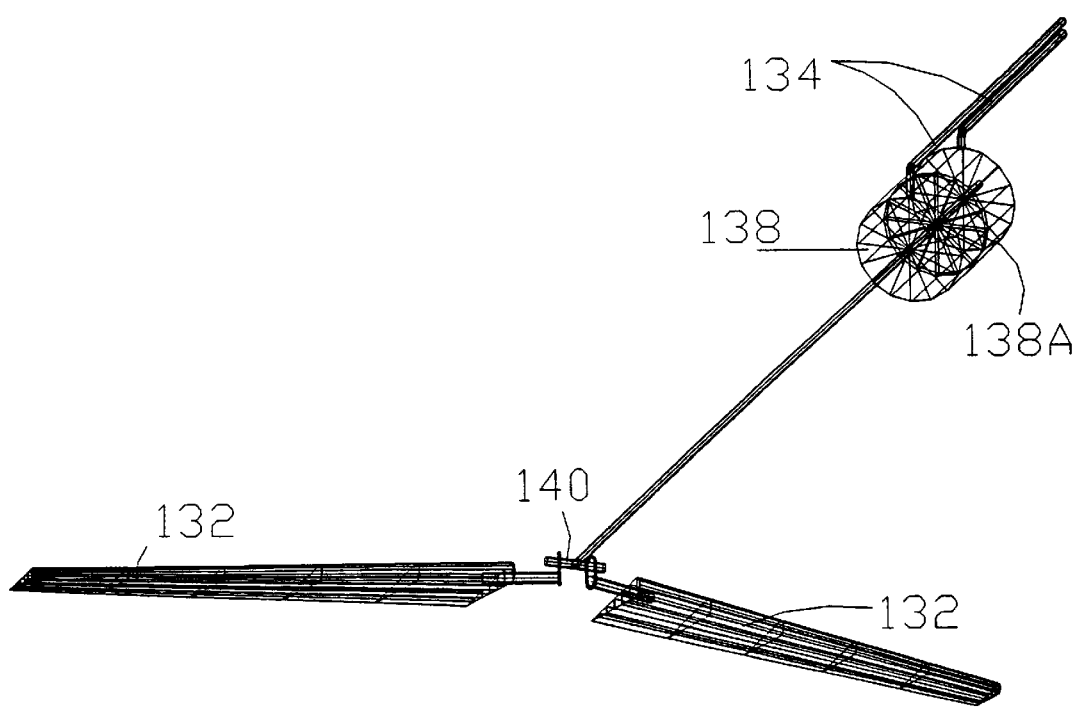
FIG. 20 is a wire mesh type perspective view of a cylinder arrangement which is connected with the control surfaces provided on the lower hydrofoil and which control the pitch of the vehicle during operation.
Figure 21:
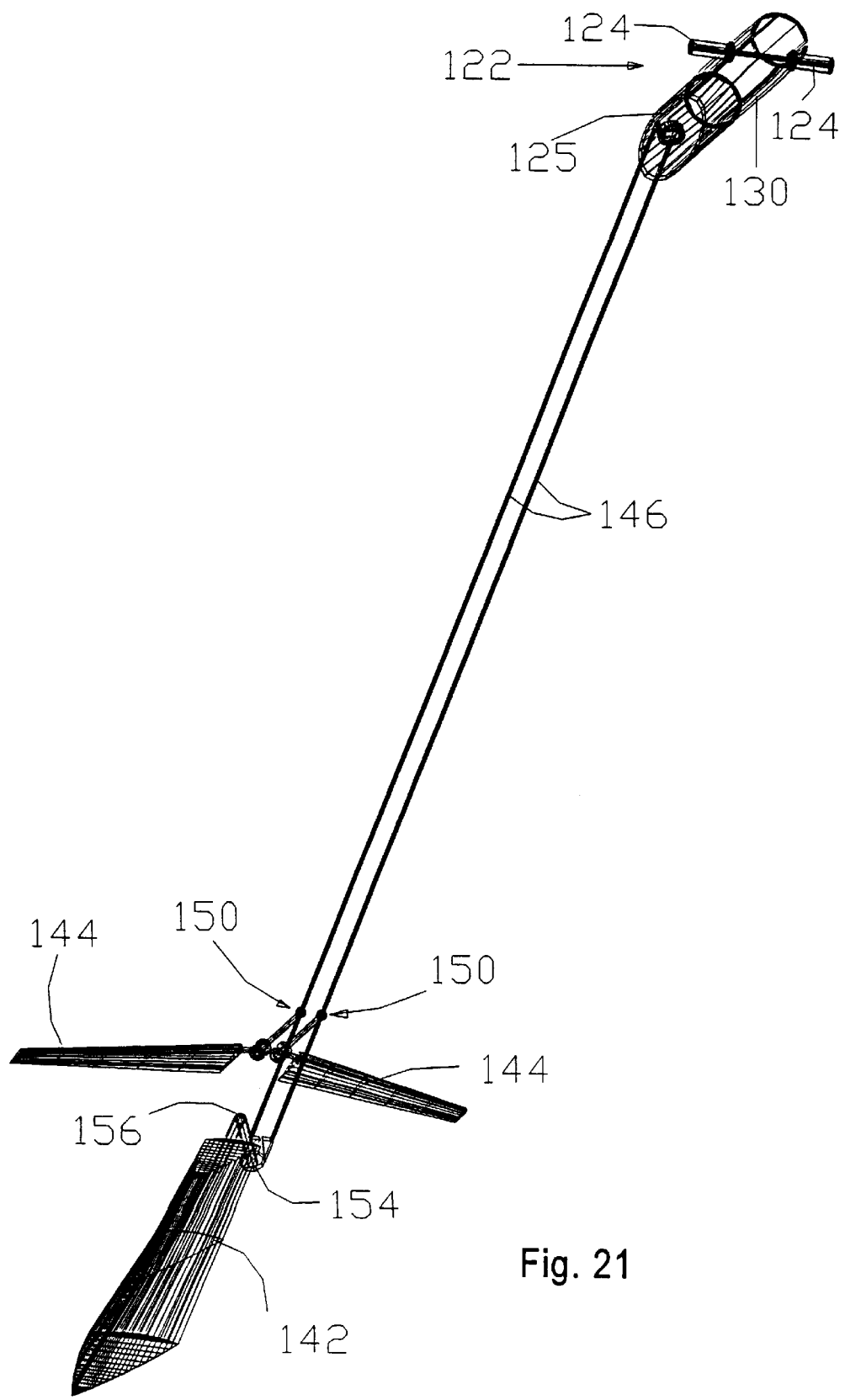
FIG. 21 is a perspective view similar to that shown in FIG. 16 showing the operative connection between the handle-bar control arrangement mounted in the nose of the vehicle and the rudder and the aileron control surfaces provided on the upper lifting hydrofoil wings.

The forward and rearward movement of the handles 124 is transferred to the control surfaces (elevators) 132 provided on the lower negative lift hydrofoil wings 110 via hydraulic hoses or conduits 134. These hoses interconnect a cylinder 136 such as illustrated in FIGS. 19 and 20, and which is disposed in the steering cylinder 122, to a servo cylinder 138 of the type shown in FIG. 20. As will be appreciated, each of the cylinders 136, 138 is provided with a piston 136A, 138A. In the case of the hydraulic cylinder 136 which is provided in the steering cylinder 122, the for/aft movement of the handles 124, pumps hydraulic fluid in and out of the chambers separated by the piston 136A along conduits 134 to the chambers of servo cylinder 138 provided in the lower section of the keel 105. In this embodiment, the servo cylinder piston 138A is connected to a link 140 which causes the elevators 132 provided on the trailing edges of the lower negative lift hydrofoil 110 to tilt synchronously up and down. This tilting of the control surfaces controls the pitch of the vehicle 100 and is used to enable climbing/diving sensations to be imparted to the rider R.

Figure 23:
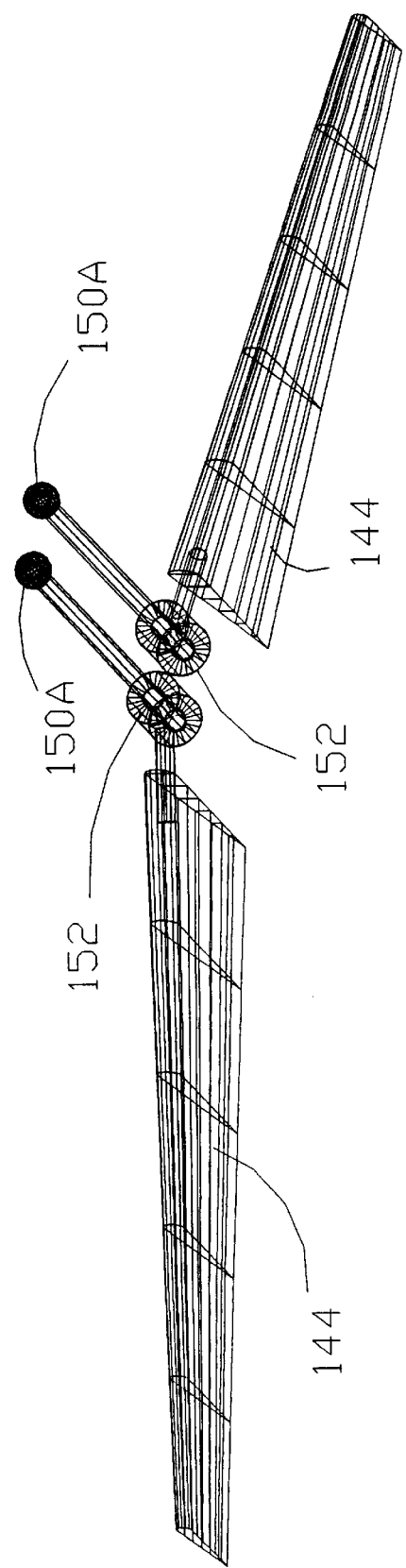
FIG. 23 is a schematic perspective view showing the gear connection which is used to operatively connect the axially movable control rods that are connected with the manually operable handle-bar control arrangement mounted in the nose of the vehicle.
Figure 24:
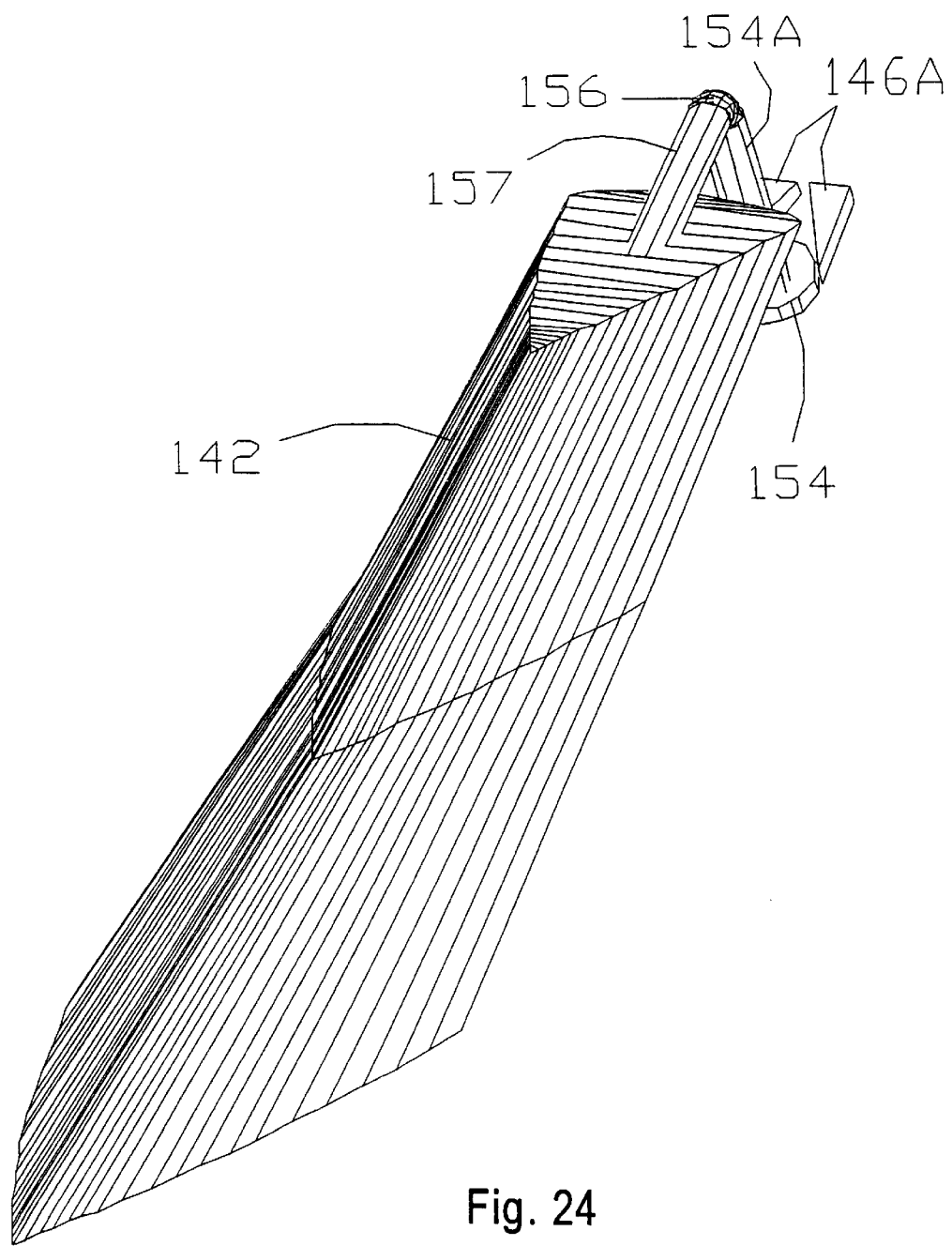
FIG. 24 is a perspective view showing the rudder and the arrangement which allows its operative connection with the axially movable control rods.

Rotation of the steering cylinder 122 is translated to both the rudder 142 and the ailerons 144 which are provided on the trailing edge of the positive lift or main hydrofoil wings 106. The translation of the cylinder rotation to the rudder 142 and ailerons 144 is achieved by the provision of two axially movable push/pull rods 146 which are interconnected at their upper ends to pins 148 provided on the rear face of the control cylinder 122. As the cylinder 122 is rotated, one of the rods 146 is pulled while the other is pushed. This axial movement of the rods 146 is translated into rotational movement of the ailerons by rack and pinion gearings 150. The pinions 150A of these rack and pinion gearings are shown in FIG. 23. The rotation of the shafts not shown associated with the pinions are connected with differential gear-like arrangements 152 which translate the rotation of the shafts 150B into pivotal movement of the ailerons 144. Since the direction of rotation of each of the pinions 150A is different, one of the ailerons 144 is induced to tilt up while the other is induced to tilt down. This, in combination with the movement of the rudder (described hereinunder), induces both steering and roll in a manner which is essentially the same as aircraft control.

The lower ends of the push/pull rods 146 are connected to the rudder by way of a disc or a suitably rotatable member 154 which acts as a crank by way of links 146A; a shaft 154A which is synchronously rotatable with the disc 154; a universal joint arrangement 156 such as two sequentially connected Hookes joints; and a shaft 157 which is rigid with the rudder 142. With this interconnection, rotation of the disc 154 induces sideways pivotal movement of the rudder 142 with respect to the keel 105.

With the above described steering cylinder arrangement 122, if a rider R wants to turn, he or she rotates or rolls the nose cone 104 and steering cylinder 122. This not only induces turn but also a corresponding roll of the vehicle due to the reversed inclination of the ailerons 144.

Nose-up or nose-down control (pitch) is controlled by moving the handles 124 either forward or back in the axial direction of the cylinder 122. Speed and height are controlled by the throttle setting which are controlled by the degree of rotation of the manually operated throttle 128.

Accordingly, with a very simple control arrangement, all of the control parameters of the vehicle can be readily adjusted and a rider R, in combination with the eccentric nose cone movement can enjoy a particularly stimulating ride.

Figure 14:
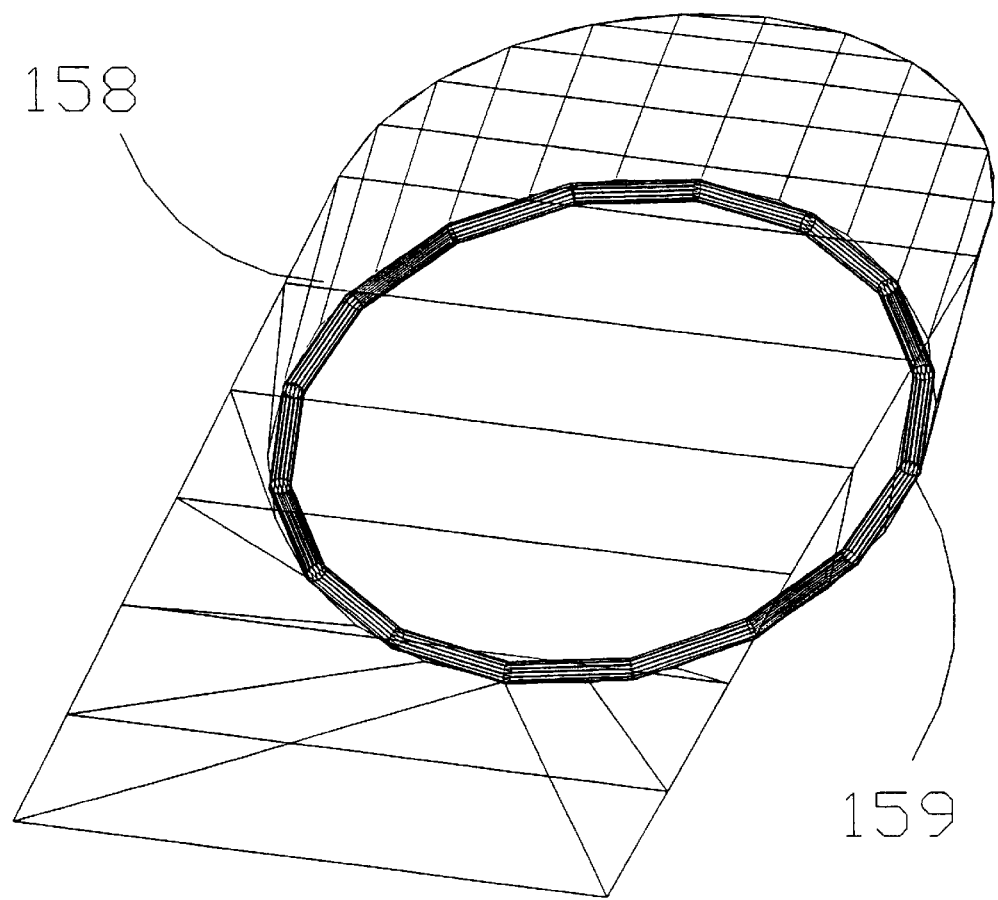
FIGS. 14 and 15 are perspective views of rider support panel which is connected to the nose cone and against which the rider leans during operation of the vehicle.
Figure 15:
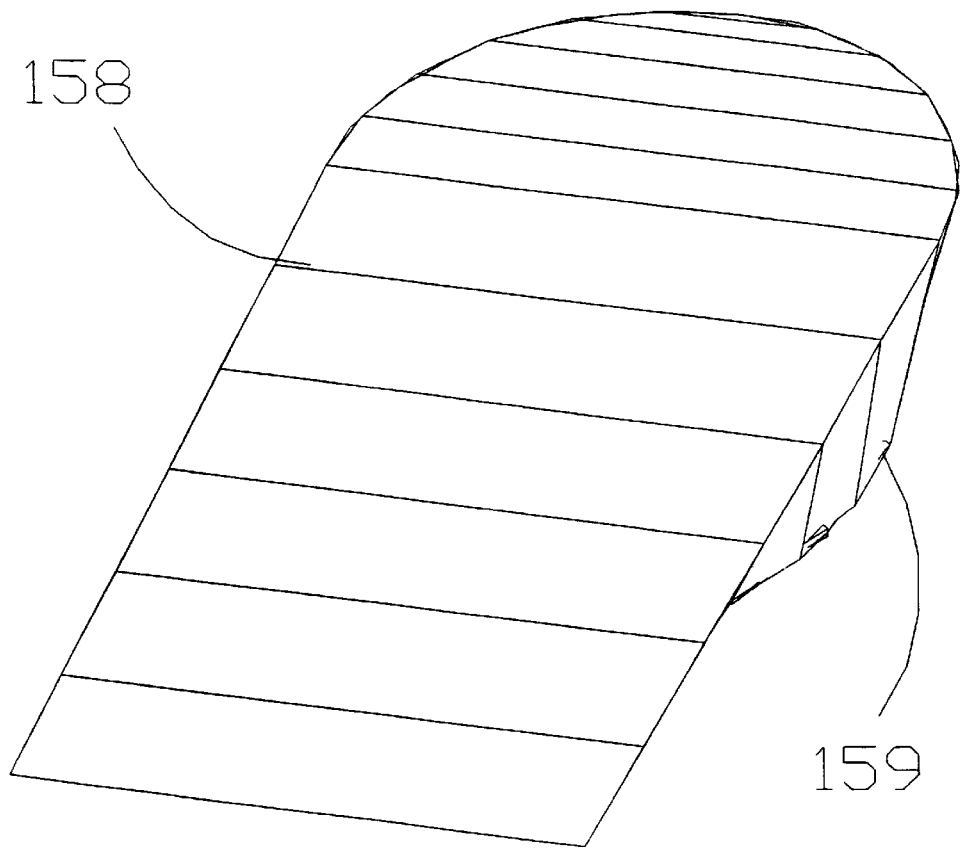
Figure 16:
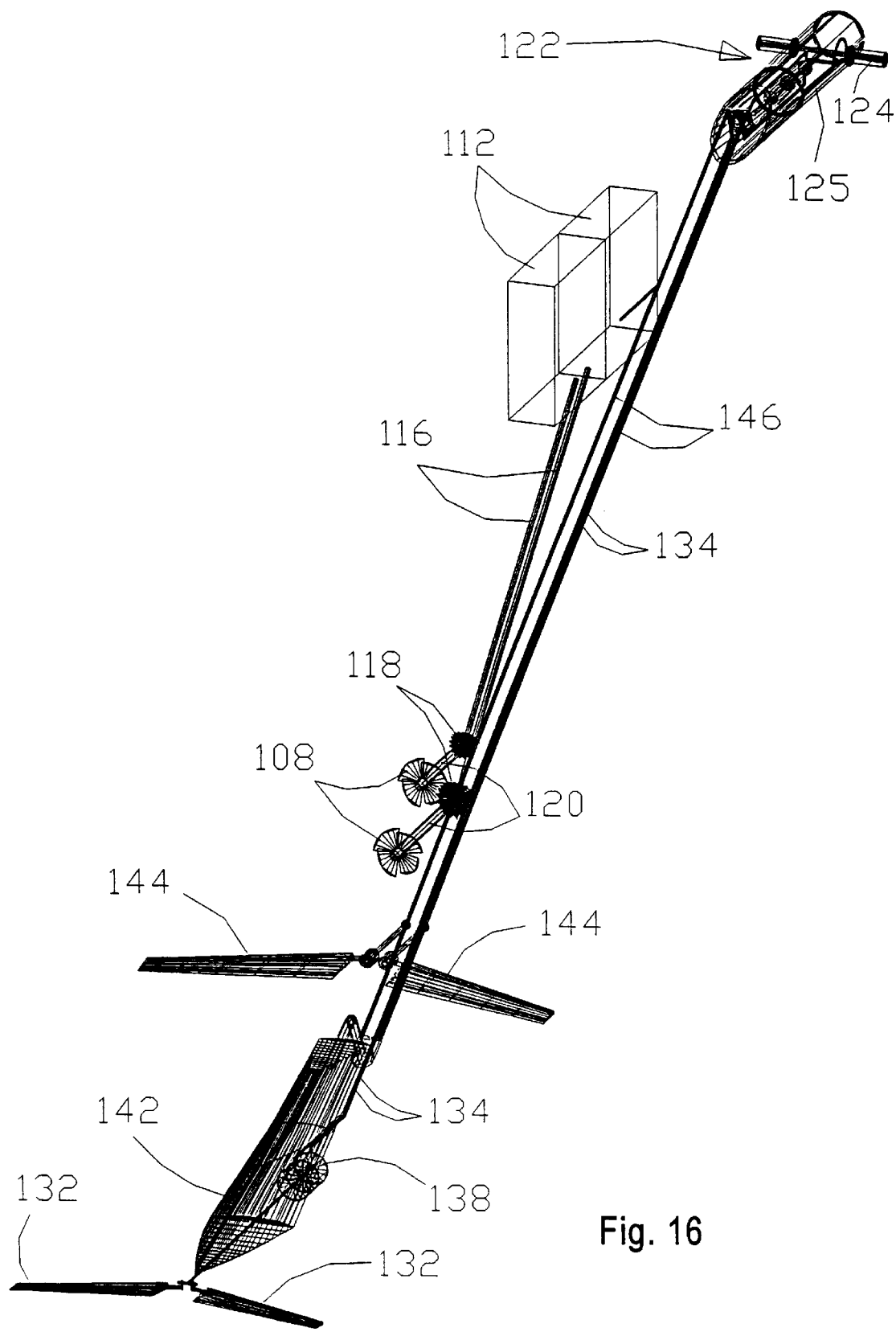
FIG. 16 is a perspective view showing details of the control and propulsion arrangements which are used in the embodiment of the invention.

As noted above, the rider R is arranged to take a semi-prone type of position during use of the vehicle—see FIGS. 2, 3 and 5–7. To facilitate this, a support plate 158 of the nature illustrated in FIG. 14, is used. This plate 158, which can be padded to increase the rider's comfort, is provided with a connection site for the nose cone 104, and is arranged to have the remaining portion rigidly connected with the main body 102 of the vehicle. The connection between the nose cone 104 and the support plate 158 is achieved through a suitable arrangement 159 such as depicted in FIGS. 14 and 15, which allows for a smooth, relatively unresisted rotation of the nose cone 104. This connection can achieved through the use of suitable rollers, roller bearings or the like, which are adapted for exposure to sea water and the associated problems.

The ease with which the nose cone 104 is rotatable with respect to the main body of the vehicle, should, of course, be sufficiently low so as to not induce fatigue in the rider's arms, but not be so low as to detract from stable operation of the craft 100. That is to say, the nature of the movement of the nose cone calls for a certain amount of resistance to ensure that it does not wobble about during vehicle operation and is not readily subject to the influences of the wind and G force, and remains fully under the control of the rider R.

In this particular embodiment, the main body 102 of the vehicle is provided with a pair of air-wings 160 and a tail 162. These elements 160, 162 are more for decoration and balance rather than flight control function. Control surfaces on the air exposed wing/tail elements can be added and aerodynamic lifting surfaces provided, if such are desired. However, the effect of these type of control surfaces is low since the speeds at which this particular craft is designed to operate in a pleasure mode, is insufficiently high to permit any effective use thereof.

Figure 8:
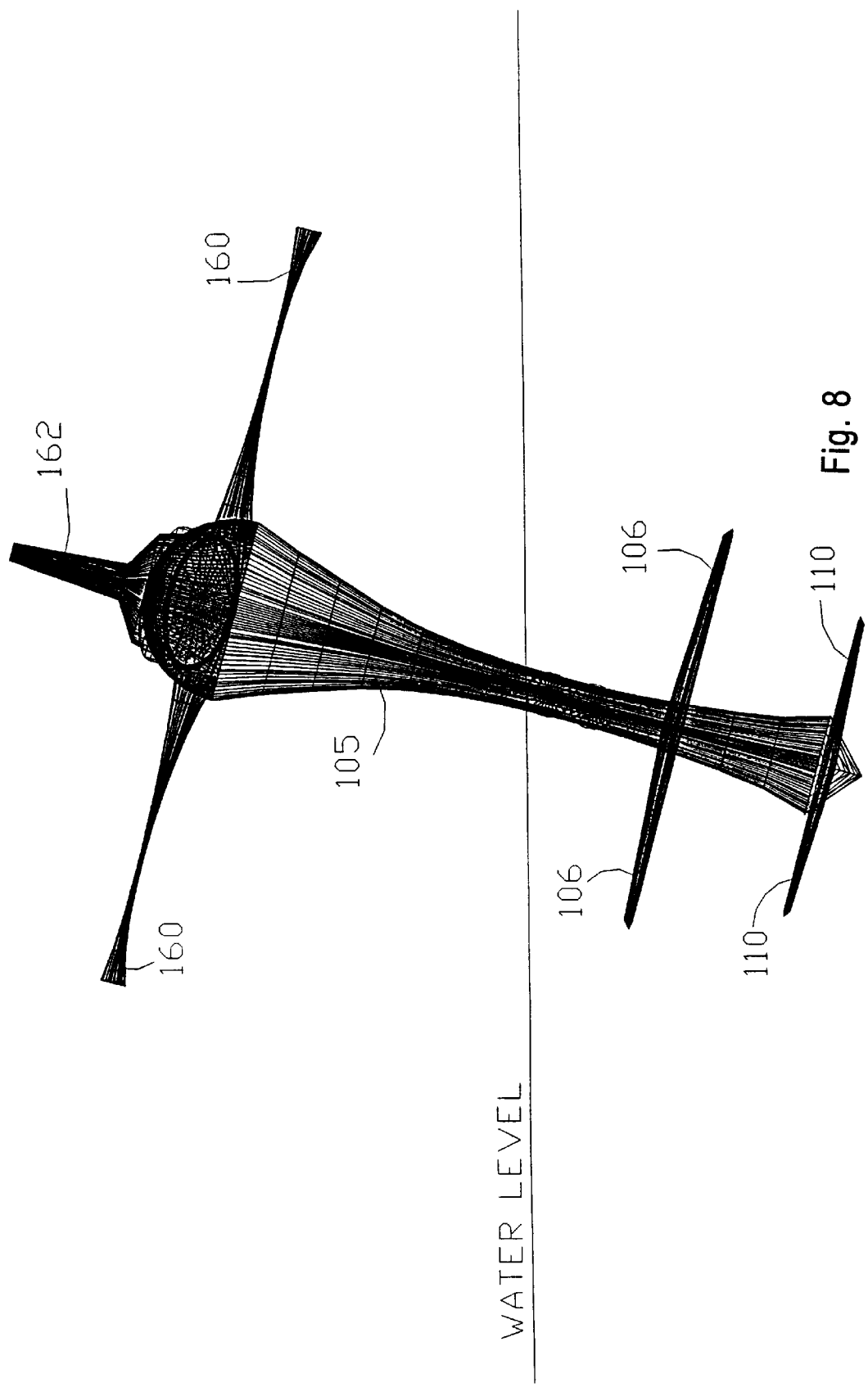
FIGS. 8 and 9 are front views depicting the manner in which the water craft is able to roll from side to side in an aircraft-like manner during operation.
Figure 9:
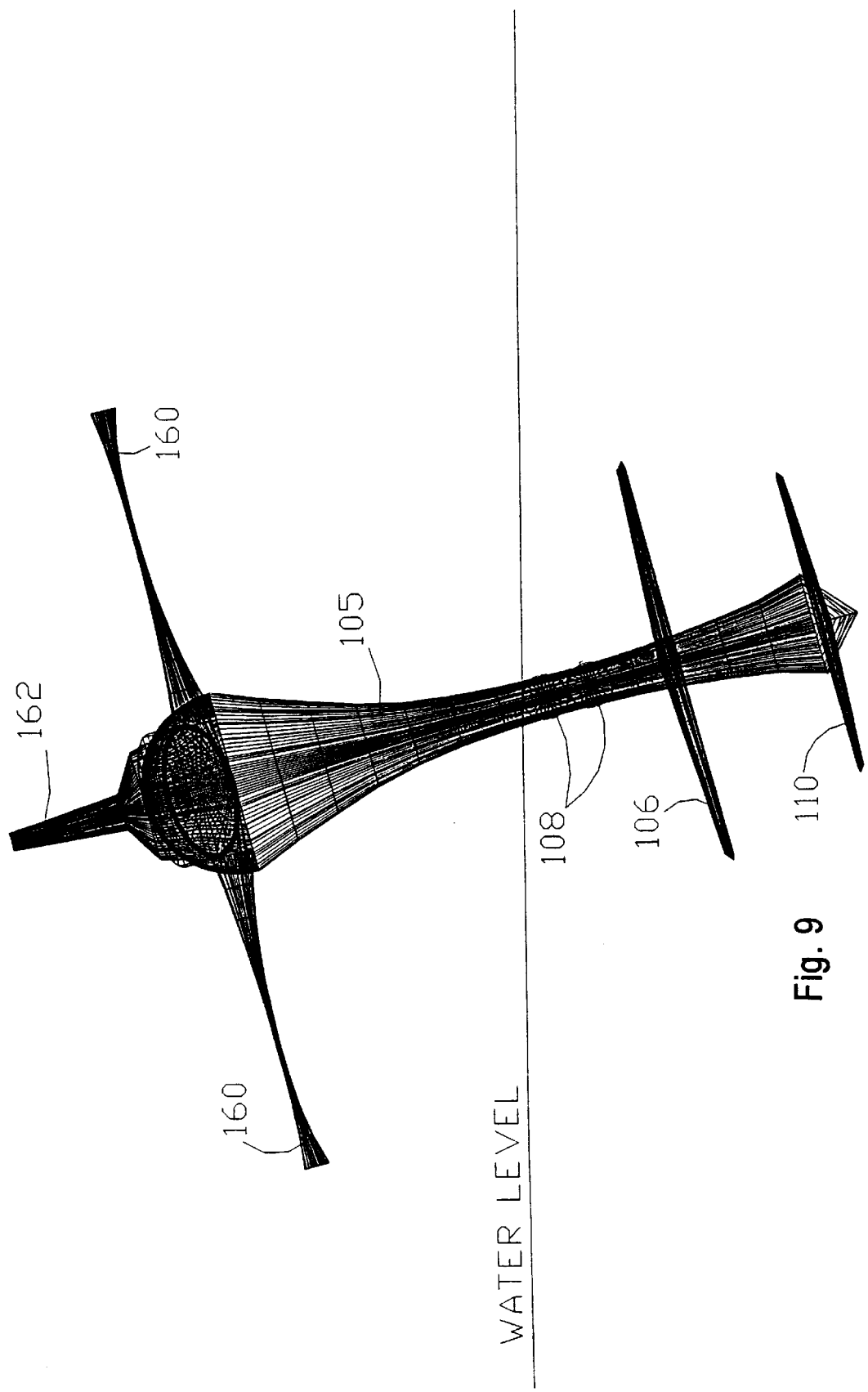
Figure 10:
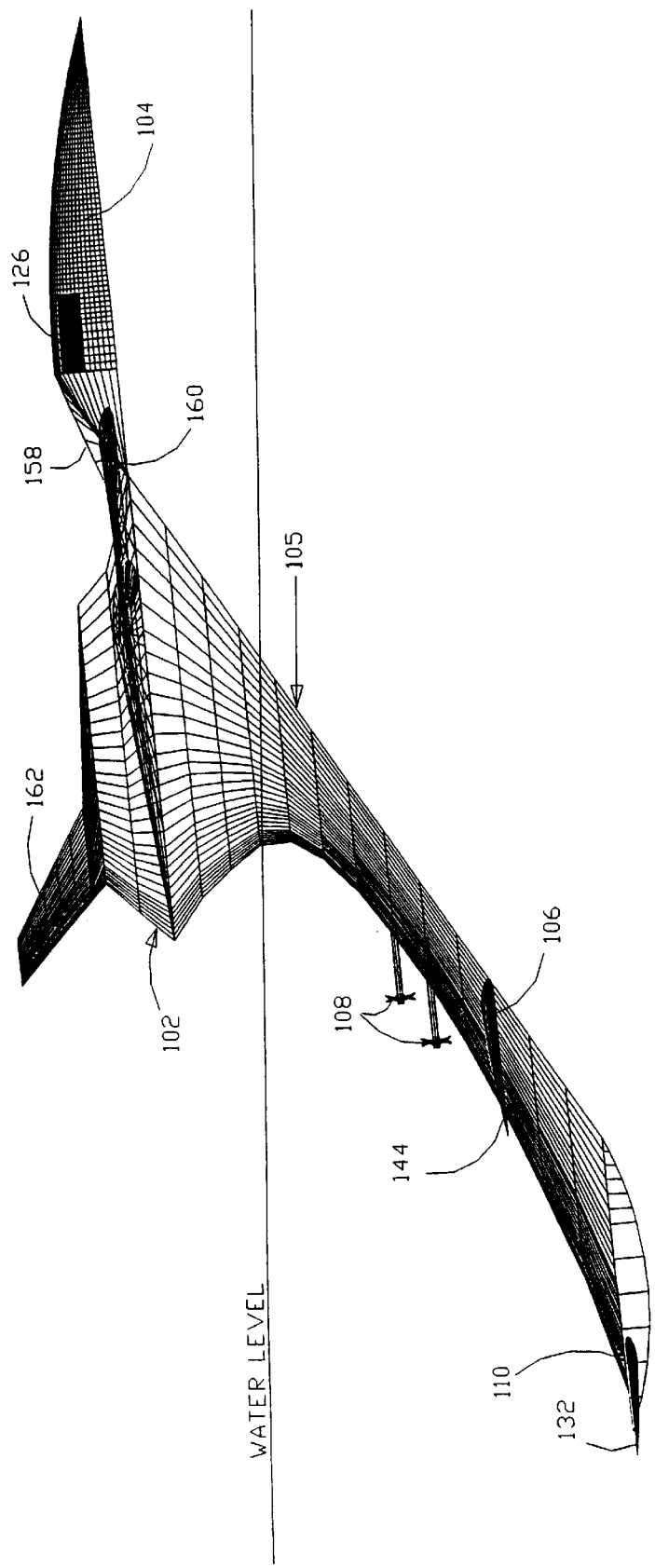
FIGS. 10 and 11 are side views which respectively shown the ability of the water craft to assume dive and climb attitudes (pitch) during operation.
Figure 11:
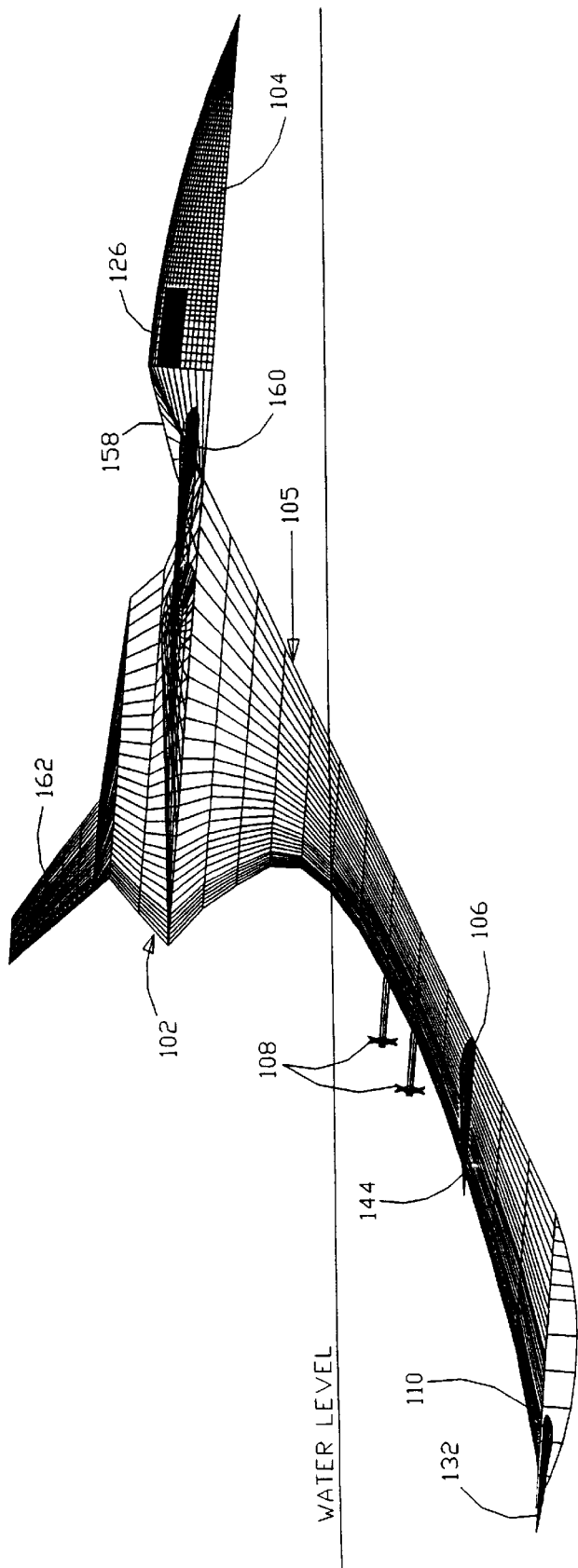

In this instance, the air-wings 160 are of the swept forward type and are intended to provided a balancing effect similar to the pole used by tight-rope walkers. A limit on the span of the wings is imposed by roll considerations. They should not be so wide as to run the risk of digging into the water (including waves) when the vehicle is caused to bank during a turn. A clearance of the nature shown in FIGS. 8 and 9 is considered suitable.

However, modifications such as upswept ends can allow for the span to be increased while maintaining a suitable safe clearance such as is required during operation in waves, chop, swell, etc.

As many of the components which compose the body 102 and nose cone 104 of the vehicle should be made of suitable plastic or fiber glass material and suitably reinforced where necessary. The keel 105 can be reinforced with a suitable framework made of a suitably strong material such as those commonly used in the construction of marine/watercraft.

It will be appreciated, that although only one embodiment of the invention has been disclosed, various modification and changes can be made without departing from the scope of the invention which is limited only by the appended claims. For example, even though the above embodiment has been described as having a movable nose cone, it is within the purview of the invention that this part of the vehicle could be made integral and the steering mechanism enclosed within same. It is also possible vary the manner in which the rider R is supported on the vehicle and the prone position which has been described and illustrated is not limiting, and provision for one or more passengers or pillion riders which assume an essentially upright riding position such as found in commonly used watercraft, can be envisaged as being possible.

The invention is not limited to a single blade type keel and the provision of pair of hydrofoil wings. For example, a pair of parallel keels with single member hydrofoils extending therebetween can readily be envisage without departing from the scope of protection.

The connections between the steering cylinder and the control surfaces on the hydrofoils and the keel are not limited to the hydraulic and mechanical arrangements which have been disclosed and various other types of control can be envisaged. That is to say, while cost, effective robustivity and simplicity, are apt to be controlling considerations, all mechanical, all hydraulic, electromechanical types of connection including "fly-by-wire" technology can be considered to be possible within the realm of the invention.

What is claimed is:

1. A water craft comprising:

a main body;

a keel extending from a lower portion of the main body;

a first hydrofoil provided on said keel, said first hydrofoil being adapted to produce a positive lift force which lifts the craft upwardly when the vehicle travels through water; and a second hydrofoil provided on said keel, said second hydrofoil being adapted to produce a negative lift force which tends to pull the vehicle downwardly when the vehicle travels through water, said second hydrofoil being located on said keel at a level which is lower than that of said first hydrofoil and located so that the negative lift force which is produced by said second hydrofoil, in combination with the positive lift force which is produced by said first hydrofoil generates a moment of force which tends to crank the front of the water craft upwardly.

2. A water craft comprising:

a main body;

a keel extending from a lower portion of the main body;

a first hydrofoil provided on said keel, said first hydrofoil being adapted to produce a positive lift force which lifts the craft upwardly when the vehicle travels through water; and a second hydrofoil provided on said keel, said second hydrofoil being adapted to produce a negative lift force which tends to pull the vehicle downwardly when the vehicle travels through water, said second hydrofoil being located on said keel at a level which is lower than that of said first hydrofoil and located so that the negative lift force which is produced by said second hydrofoil, in combination with the positive lift force which is produced by said first hydrofoil generates a moment of force which tends to crank the front of the water craft upwardly;

wherein said keel extends downwardly and rearwardly of said main body, wherein said second hydrofoil is located both below and aft of the first hydrofoil, and wherein said keel further comprises a rudder which is selectively movable with respect to the keel, said rudder being located on said keel between said first and second hydrofoils.

3. A water craft as set forth in claim 1, wherein said keel is angled rearwardly with respect to said main body and is connected to said main body at a location aft of said nose cone.

4. A water craft comprising:

a main body;

a keel extending from a lower portion of the main body;

a first hydrofoil provided on said keel, said first hydrofoil being adapted to produce a positive lift force which lifts the craft upwardly when the vehicle travels through water;

a second hydrofoil provided on said keel, said second hydrofoil being adapted to produce a negative lift force which tends to pull the vehicle downwardly when the vehicle travels through water, said second hydrofoil being located on said keel at a level which is lower than that of said first hydrofoil and located so that the negative lift force which is produced by said second hydrofoil, in combination with the positive lift force which is produced by said first hydrofoil generates a moment of force which tends to crank the front of the water craft upwardly, and a nose cone, said nose cone being rotatably mounted at the front of said main body and arranged to be rotatable in accordance with manual manipulation by a rider.

5. A water craft as set forth in claim 4, further comprising selectively movable control surfaces which are provided on said keel and on at least one of said first and second hydrofoils.

6. A water craft as set forth in claim 5, further comprising manually controllable control means disposed in said nose cone, said control means being operatively connected with said selectively movable control surfaces.

7. A water craft as set forth in claim 6, wherein said manually controllable control means includes a manually operable motor cycle-like hand throttle which is operatively connected with a motor disposed in the water craft, and which controls the power output thereof.

8. A water craft as set forth in claim 5, wherein said first and second hydrofoils respectively comprise first and second pairs of hydrofoil wings which extend out from said keel, and wherein said control surfaces are respectively provided on trailing edges of said keel and said first and second pairs of hydrofoil wings.

9. A water craft as set forth in claim 4, further comprising a propulsion arrangement, said propulsion arrangement including a motor and means operatively connected with the motor for generating a forward driving force which propels the craft through the water.

10. A water craft as set forth in claim 9, wherein said operative connection means includes contra-rotating shafts which are operatively connected with first and second propellers which are rotatably supported on said keel.

11. A water craft as set forth in claim 9, wherein said motor is disposed in the main body of the craft and located aft of a rider's seating position.

12. A water craft as set forth in claim 4, wherein said nose cone is operatively connected with manually controllable control means so as to be rotated in accordance with the manipulation of the manually controllable control means.

13. A water craft comprising:

a main body;

a keel extending from a lower portion of the main body;

a first hydrofoil provided on said keel, said first hydrofoil being adapted to produce a positive lift force which lifts the craft upwardly when the vehicle travels through water;

a second hydrofoil provided on said keel, said second hydrofoil being adapted to produce a negative lift force which tends to pull the vehicle downwardly when the vehicle travels through water, said second hydrofoil being located on said keel at a level which is lower than that of said first hydrofoil and located so that the negative lift force which is produced by said second hydrofoil, in combination with the positive lift force which is produced by said first hydrofoil generates a moment of force which tends to crank the front of the water craft upwardly;

selectively movable control surfaces provided on said first hydrofoil, said second hydrofoil, and on said keel; and manually controllable control means operatively connected with said selectively movable control surfaces; said manually controllable control means comprising:

a steering cylinder;

a pair of handle bar-like handles operatively supported on said steering cylinder for rotating the cylinder about an axis of rotation, said pair of handles being movably axially along said steering cylinder;

means, disposed in said steering cylinder for, in response to axial movement of said handles, inducing movement of a control surface on the second hydrofoil; and means operatively connected with said steering cylinder, for, in response to rotation of said steering cylinder about its axis, translating the rotation to control surfaces on said first hydrofoil and on said keel.

14. A water craft as set forth in claim 13, comprising semi-prone rider support means which is adapted to support a rider in a semi-prone riding position and which is located immediately aft of a nose cone, said nose cone being provided with left and right apertures through which the left and right arms of a rider can be passed and which provide access to said handles supported on said steering cylinder.

* * * * *